United States Patent
Noma et al.

(10) Patent No.: US 9,759,115 B2
(45) Date of Patent: Sep. 12, 2017

(54) EXHAUST GAS PURIFICATION SYSTEM

(71) Applicant: YANMAR CO., LTD., Osaka (JP)

(72) Inventors: Yasuo Noma, Osaka (JP); Hiroshi Oohashi, Osaka (JP); Atsushi Ohta, Osaka (JP); Tomohiro Fukuda, Osaka (DE); Taichi Togashi, Osaka (DE)

(73) Assignee: Yanmar Co., Ltd., Osaka (JP)

(*) Notice: Subject to any disclaimer, the term of this patent is extended or adjusted under 35 U.S.C. 154(b) by 0 days.

(21) Appl. No.: 14/942,208

(22) Filed: Nov. 16, 2015

(65) Prior Publication Data
US 2016/0069240 A1 Mar. 10, 2016

Related U.S. Application Data

(62) Division of application No. 13/695,942, filed as application No. PCT/JP2011/060463 on Apr. 28, 2011, now Pat. No. 9,416,713.

(30) Foreign Application Priority Data

May 7, 2010 (JP) .................................. 2010-107343
May 7, 2010 (JP) .................................. 2010-107345

(51) Int. Cl.
F01N 9/00 (2006.01)
F01N 3/035 (2006.01)
(Continued)

(52) U.S. Cl.
CPC ............. F01N 9/002 (2013.01); B01D 53/92 (2013.01); F01N 3/0253 (2013.01); F01N 3/035 (2013.01);
(Continued)

(58) Field of Classification Search
CPC . B01D 53/92; F02D 41/029; F02D 2041/228; F02D 2200/0812; F02D 41/025;
(Continued)

(56) References Cited

U.S. PATENT DOCUMENTS

| | | | | |
|---|---|---|---|---|
| 5,809,775 A | * | 9/1998 | Tarabulski | B01D 53/90 423/212 |
| 6,266,955 B1 | * | 7/2001 | Liang | F01N 3/2066 123/1 A |
| 2006/0086080 A1 | * | 4/2006 | Katogi | F01N 3/035 60/278 |
| 2007/0022746 A1 | | 2/2007 | Decou et al. | |
| 2007/0137184 A1 | * | 6/2007 | Patchett | B01D 5/0054 60/286 |
| 2007/0295003 A1 | * | 12/2007 | Dingle | F01N 3/035 60/301 |
| 2009/0272104 A1 | * | 11/2009 | Garimella | B01D 53/9409 60/287 |
| 2009/0272105 A1 | * | 11/2009 | Chi | B01D 53/9409 60/295 |
| 2010/0024390 A1 | * | 2/2010 | Wills | F01N 13/009 60/274 |

(Continued)

FOREIGN PATENT DOCUMENTS

CN 101302954 11/2008
EP 1 584 806 3/2005
(Continued)

*Primary Examiner* — Shogo Sasaki
(74) *Attorney, Agent, or Firm* — Norris McLaughlin & Marcus, P.A.

(57) ABSTRACT

An exhaust gas purification system comprises an exhaust gas purification device which is arranged in an exhaust gas route of an engine, renewing devices for burning and removing a particulate matter within the exhaust gas purification device, renewal advance notifying means which is actuated in the case that a clogged state of the exhaust gas purification device becomes equal to or more than a prescribed level, and renewal informing means which informs of a fact that the renewing devices are under operation. The renewal advance notifying means is actuated before actuating the renewing devices.

5 Claims, 8 Drawing Sheets

(51) Int. Cl.

| | |
|---|---|
| *F01N 3/10* | (2006.01) |
| *F01N 11/00* | (2006.01) |
| *F02D 41/02* | (2006.01) |
| *B01D 53/92* | (2006.01) |
| *F01N 13/00* | (2010.01) |
| *F01N 3/025* | (2006.01) |
| *F02D 41/22* | (2006.01) |
| *F02D 41/40* | (2006.01) |

(52) U.S. Cl.
CPC ............ *F01N 3/103* (2013.01); *F01N 11/002* (2013.01); *F01N 13/009* (2014.06); *F01N 13/0097* (2014.06); *F02D 41/029* (2013.01); *F01N 2430/085* (2013.01); *F01N 2470/02* (2013.01); *F01N 2550/04* (2013.01); *F02D 41/025* (2013.01); *F02D 41/405* (2013.01); *F02D 2041/228* (2013.01); *F02D 2200/0812* (2013.01); *Y02T 10/47* (2013.01)

(58) Field of Classification Search
CPC .... F02D 41/405; F01N 3/035; F01N 13/0097; F01N 9/002; F01N 11/002; F01N 2430/085; F01N 2470/02; F01N 2550/04; F01N 3/103; Y02T 10/47

USPC ............ 700/266, 271; 701/108; 60/295, 297
See application file for complete search history.

(56) References Cited

U.S. PATENT DOCUMENTS

| | | | |
|---|---|---|---|
| 2010/0024393 A1* | 2/2010 | Chi | F01N 3/208 60/276 |
| 2010/0024397 A1* | 2/2010 | Chi | F01N 3/106 60/285 |
| 2010/0275580 A1 | 11/2010 | Abraham et al. | |

FOREIGN PATENT DOCUMENTS

| | | |
|---|---|---|
| EP | 1 965 061 | 2/2008 |
| JP | 2000-145430 | 5/2000 |
| JP | 2003-027922 | 1/2003 |
| JP | 2003-104071 | 4/2003 |
| JP | 2005-113752 | 4/2005 |
| JP | 2009-257323 | 11/2009 |
| JP | 2010-084686 | 4/2010 |

* cited by examiner

EXHAUST GAS PURIFICATION SYSTEM

This is a Divisional Application of U.S. Ser. No. 13/695,942 filed Dec. 12, 2012, now U.S. Pat. No. 9,416,713.

BACKGROUND OF THE INVENTION

The present invention relates to an exhaust gas purification system with respect to an engine which is mounted to a working machine, for example, a construction machine, an agricultural machine and an engine generator.

In recent years, as an application of an emission control of a high order with regard to a diesel engine (hereinafter, refer simply to as an engine), it is going to be desired to mount an exhaust gas purification device which purifies an air pollutant in an exhaust gas, to a construction machine, an agricultural machine and an engine generator to which the engine is mounted. As the exhaust gas purification device, a diesel particulate filter (hereinafter, refer to as DPF) has been known (refer to Patent Documents 1 and 2). The DPF is provided for collecting a particulate matter (hereinafter, refer to as PM) or the like. In this case, if the PM which is collected by the DPF exceeds a prescribed amount, a distribution resistance within the DPF is increased and thereby causing a reduction of an engine output. Accordingly, it is also frequently carried out to remove the PM which is deposited in the DPF on the basis of a temperature rise of the exhaust gas so as to bring back a PM collecting capacity of the DPF (renew the DPF).

CITATION LIST

Patent Document 1: Japanese Patent Application Laid-open No. 2000-145430
Patent Document 2: Japanese Patent Application Laid-open No. 2003-27922

SUMMARY OF THE INVENTION

However, since it is necessary to enhance an exhaust gas temperature (apply a thermal energy to the exhaust gas) in the case the DPF is renewed in the conventional structure, a fuel consumption rate is increase to exceed an operating amount of an accelerator operating device such as a throttle lever and an accelerator pedal, thereby enlarging an engine output. Accordingly, since there are generated a shock and a change of an engine sound which are caused by a fluctuation of the engine torque, an uncomfortable feeling is applied to an operator. It is impossible to deny a possibility that the operator misidentifies the sudden shock and the change of the engine sound as an abnormality. Particularly, in a construction machine such as a hydraulic shovel which performs a careful work on the basis of the engine sound, the sudden shock and the change of the engine sound which are generated at a time of renewing the DPF are not preferable.

A first object of the present invention is to dissolve a problem that an uncomfortable feeling is given to an operator due to a shock or a change of an engine sound caused by a fluctuation of an engine torque.

In the meantime, the engine is mounted to various working machines, for example, a construction machine, an agricultural machine and an engine generator. Accordingly, in an engine with a DPF, even if a DPF renewing motion is executed by rising an exhaust gas temperature, there may be a case that a DPF purifying capacity is not sufficiently recovered (a case that the renewal is not sufficient). In this regard, if the engine with the DPF is of a common rail type (a fuel injection device is of a common rail type), it is possible to promote the DPF renewal by a positive heating that a fuel is supplied into the DPF by a post injection so as to be burnt.

However, in the case that a drive state in which a sufficient temperature rising action can not be obtained, for example, even by executing a post injection continues, the PM is excessively deposited within the DPF. In the case that the DPF renewing motion is executed under the condition mentioned above, there is brought about an adverse effect that a crack is generated in the DPF or the DPF is melted away due to a rapid combustion of the PM which is excessively deposited. Accordingly, in this kind of exhaust gas purification system, it is necessary to securely prevent the PM from being excessively deposited within the DPF before falling into the condition mentioned above.

A second object of the present invention is to securely prevent a particulate matter from being excessively deposited within an exhaust gas purification device, at the time of renewal of the exhaust gas purification device.

According to a first aspect of the invention, there is provided an exhaust gas purification system, the exhaust gas purification system including an exhaust gas purification device which is arranged in an exhaust gas route of a common rail type engine, a renewing device for burning and removing a particulate matter within the exhaust gas purification device, renewal advance notifying means which is actuated in the case that a clogged state of the exhaust gas purification device becomes equal to or more than a prescribed level, and renewal informing means which informs a fact that the renewing device is under operation, wherein the renewal advance notifying means is actuated before actuating the renewing device.

According to a second aspect of the invention, there is provided the exhaust gas purification system as recited in the first aspect, wherein the renewal advance notifying means and the renewal informing means are constructed by a single display device, and the renewal advance notification and the renewal information are displayed on the basis of different aspects.

According to a third aspect of the invention, there is provided the exhaust gas purification system as recited in the first or second aspect, further including renewal inhibition input means which inhibits a renewing motion of the exhaust gas purification device, wherein the renewing device is not actuated under inhibiting operation of the renewal inhibition input means, regardless of the clogged state of the exhaust gas purification device.

According to a fourth aspect of the invention, there is provided the exhaust gas purification system as recited in the third aspect, further including renewal inhibition informing means which is actuated under inhibiting operation of the renewal inhibition input means.

According to a fifth aspect of the invention, there is provided the exhaust gas purification system as recited in the first aspect, wherein in the case that the clogged state of the exhaust gas purification device is not improved even by executing a reset renewing mode which supplies a fuel into the exhaust gas purification device by a post injection, an emergency renewing mode which supplies the fuel into the exhaust gas purification device by the post injection and maintains a rotating speed of the engine at a predetermined value is executed.

According to a sixth aspect of the invention, there is provided the exhaust gas purification system as recited in the fifth aspect, further including renewal admittance input means which allows an actuation of the renewing device, wherein in the case that the clogged state of the exhaust gas purification device is not improved even by executing the reset renewing mode, the renewal advance notifying means is actuated, and the emergency renewing mode is executed when an allowing operation of the renewal admittance input means is carried out under actuation of the renewal advance notifying means.

According to a seventh aspect of the invention, there is provided the exhaust gas purification system as recited in the sixth aspect, further including parking brake operating means which maintains and operates the working machine mounted with the engine in a braked state, wherein in the case that a braking operation of the parking brake operating means is not carried out, the emergency renewing mode is not executed regardless of the clogged state of the exhaust gas purification device and the operated state of the renewal admittance input means.

According to an eighth aspect of the invention, there is provided the exhaust gas purification system as recited in any one of the fifth to seventh aspects, wherein in the case that the clogged state of the exhaust gas purification device is improved after the execution of the emergency renewing mode, the mode is returned to the normal drive mode.

According to the invention of the first aspect, since the exhaust gas purification system includes the exhaust gas purification device which is arranged in the exhaust gas route of the common rail type engine, the renewing device for burning and removing the particulate matter within the exhaust gas purification device, the renewal advance notifying means which is actuated in the case that the clogged state of the exhaust gas purification device becomes equal to or more than the prescribed level, and the renewal informing means which informs the fact that the renewing device is under operation, and the renewal advance notifying means is actuated before actuating the renewing device, an operator can previously assume a shock of a torque fluctuation and a change of an engine sound which are generated thereafter by the renewal advance notification. Further, the operator can easily comprehend a change to the renewing motion of the exhaust gas purification device by the renewal information. Therefore, there can be achieved an effect of doing away with an uncomfortable feeling of the operator which is caused by the renewing motion of the exhaust gas purification device. For example, it is possible to compensate a defect in the renewing motion of the exhaust gas purification device which may obstruct the careful work which the operator executes on the basis of the engine sound.

According to the invention of the second aspect, since the renewal advance notifying means and the renewal informing means are constructed by the single display device, and the renewal advance notification and the renewal information are displayed on the basis of different aspects, it is possible to recognize distinctively the renewal advance notification and the renewal information on the basis of the different aspects, in spite of the use of the single display device. Therefore, there is achieved an effect that the operator can easily comprehend with or without the renewing motion of the exhaust gas purification device. In addition, it is not necessary to individually provide the renewal advance notifying means and the renewal informing means, and it is possible to contribute to a cost reduction of this king of display device.

According to the invention of the third aspect, since the renewal inhibition input means which inhibits the renewing motion of the exhaust gas purification device is provided, and the exhaust gas purification system is structured such that the renewing device is not actuated under inhibiting operation of the renewal inhibition input means, regardless of the clogged state of the exhaust gas purification device, it is possible to inhibit the renewing motion of the exhaust gas purification device on the basis of an intention of the operator depending on the state of the working machine to be mounted with the engine. Therefore, there is achieved an effect of smoothly carrying out the careful work which the operator executes on the basis of the engine sound, in spite of the fact that it is possible to automatically execute the renewing control for recovering a particulate matter collecting capacity of the exhaust gas purification device. In other words, it is possible to do away with the defect in the renewing motion of the exhaust gas purification device which may obstruct the careful work.

According to the invention of the fourth aspect, since the renewal inhibition informing means which is actuated under inhibiting operation of the renewal inhibition input means is provided, it is possible to visually appeal to the operator the fact that the renewing motion of the exhaust gas purification device is inhibited by the information of the renewal inhibition informing means, as long as the renewal inhibition input means is operated to inhibit, and to securely call the operator's attention. There is also an advantage that it is possible to easily confirm whether the renewal is under inhibition, by checking the state of the renewal inhibition informing means.

According to the invention of the fifth aspect, since in the case that the clogged state of the exhaust gas purification device is not improved even by executing the reset renewing mode which supplies the fuel into the exhaust gas purification device by the post injection, the emergency renewing mode which supplies the fuel into the exhaust gas purification device by the post injection and maintains the rotating speed of the engine at the predetermined value is executed, it is possible to prevent the particulate matter within the exhaust gas purification device from increasing to the excessively deposited state which may cause the runaway combustion, and to suppress the runaway combustion of the particulate matter from being generated within the exhaust gas purification device. Therefore, it is possible to prevent a malfunction of the exhaust gas purification device and the engine which is caused by the excessive deposition of the particulate matter.

According to the invention of the sixth aspect, since the renewal admittance input means which allows the actuation of the renewing device is provided, and in the case that the clogged state of the exhaust gas purification device is not improved even by executing the reset renewing mode, the renewal advance notifying means is actuated, and the emergency renewing mode is executed when the allowing operation of the renewal admittance input means is carried out under actuation of the renewal advance notifying means, the emergency renewing mode is not executed without intention of the operator. Therefore, in the emergency renewing mode in which the rotating speed of the engine is widely increased, the operator can previously assume the shock of the torque fluctuation and the change of the engine sound. Accordingly, it is possible to avoid an unexpected occurrence, for example, a rapid acceleration of the working machine to be mounted with the engine.

According to the invention of the seventh aspect, since the parking brake operating means which maintains and operates the working machine mounted with the engine in the braked state is provided, and in the case that the braking operation of the parking brake operating means is not carried out, the emergency renewing mode is not executed regardless of the clogged state of the exhaust gas purification device and the operated state of the renewal admittance input means, it is possible to inhibit the mode from changing to the emergency renewing mode, until the operator intentionally stops the traveling and the various works of the working machine. Accordingly, in the emergency renewing mode in which the rotating speed of the engine is widely increased, it is possible to securely avoid an unexpected occurrence, for example, a rapid acceleration of the working machine. In other words, a higher effect can be achieved, as an interlock structure (a glitch preventing structure) with respect to the execution of the emergency renewing mode.

According to the invention of the eighth aspect, since in the case that the clogged state of the exhaust gas purification device is improved after the execution of the emergency renewing mode, the mode is returned to the normal drive mode, it is not necessary for the operator to carry out the returning operation, for example, for changing the mode. Therefore, it is possible to save the labor hour and to lighten the operation load of the operator.

DESCRIPTION OF THE PREFERRED EMBODIMENTS

Figure 1:
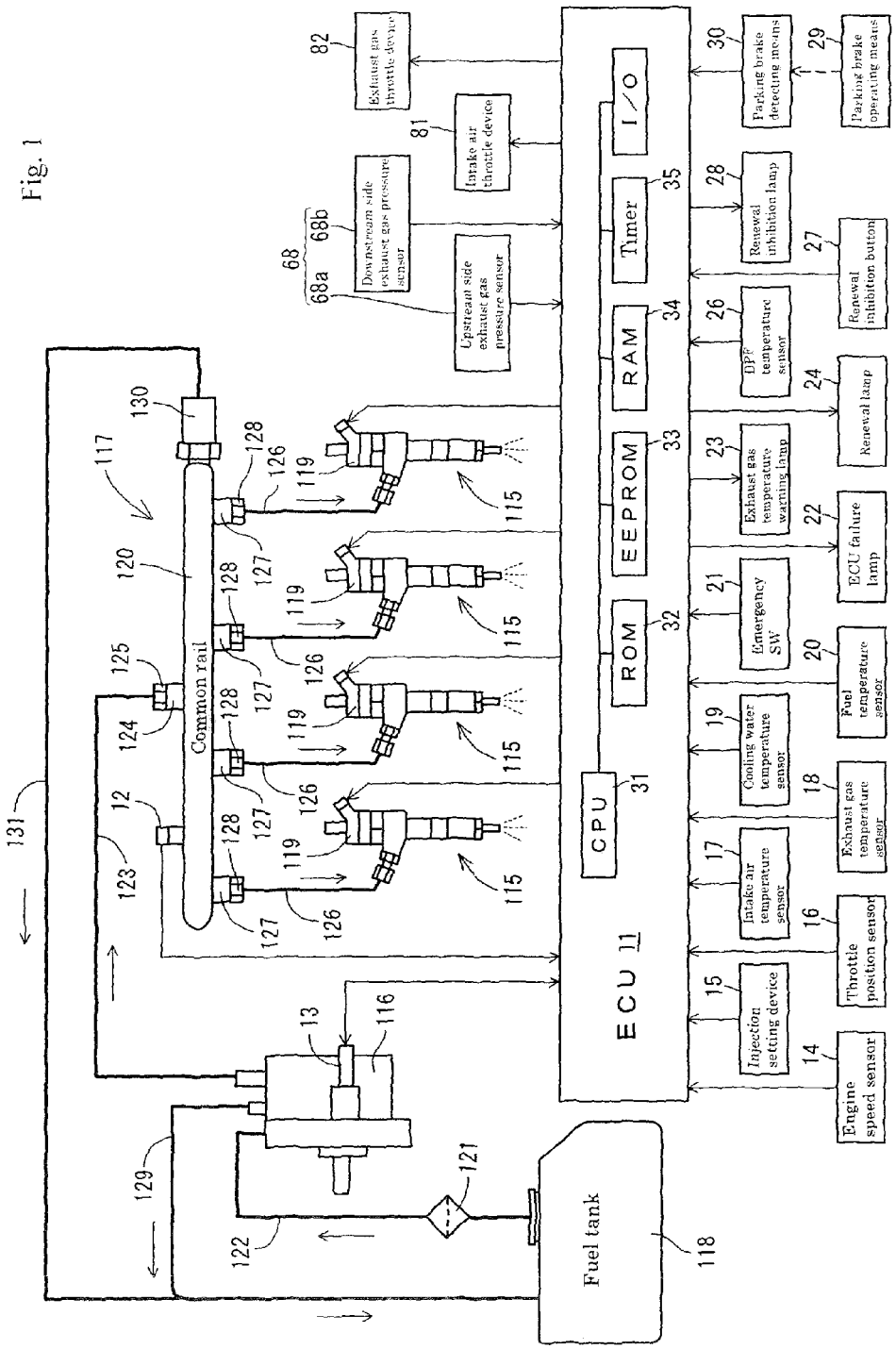
FIG. 1 is an explanatory view of a fuel system of an engine.

A description will be given below of an embodiment which embodies the present invention on the basis of the accompanying drawings.
(1) Engine and Peripheral Structure of the Same Next, a description will be given of the engine 70 and a peripheral structure of the same, with reference to FIG. 1 and FIG. 2. As shown in FIG. 2, the engine 70 is the four-cylinder type diesel engine, and is provided with a cylinder block 75 in which a cylinder head 72 is fastened to an upper face. An intake manifold 73 is connected to one side face of the cylinder head 72, and an exhaust manifold 71 is connected to the other side face. A common rail system 117 which supplies a fuel to each of cylinders of the engine 70 is provided below the intake manifold 73 in a side face of the cylinder block 75. An intake air throttle device 81 for regulating an intake air pressure (an amount of intake air) of the engine 70 and an air cleaner (not shown) are connected to an intake pipe 76 which is connected to an air intake upstream side of the intake manifold 73.

Figure 2:
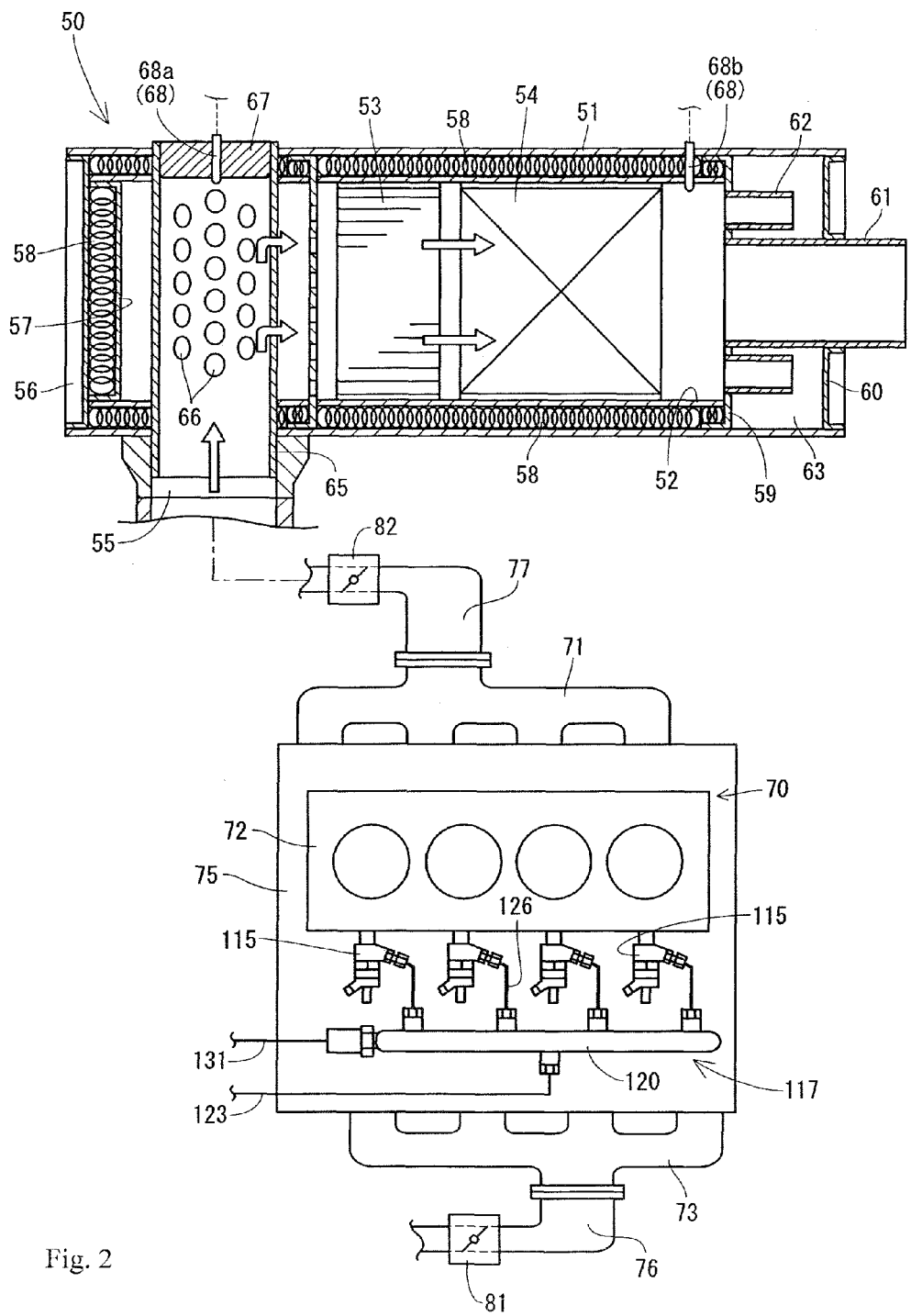
FIG. 2 is a function block diagram showing a relationship between the engine and an exhaust gas purification device.

As shown in FIG. 1, a fuel tank 118 is connected to each of injectors 115 for four cylinders in the engine 70 via a common rail system 117 and a fuel supply pump 116. Each of the injectors 115 is provided with a fuel injection valve 119 of an electromagnetically opening and closing control type. The common rail system 117 is provided with a cylindrical common rail 120. The fuel tank 118 is connected to an air intake side of the fuel supply pump 116 via a fuel filter 121 and a low pressure pipe 122. A fuel within the fuel tank 118 is sucked into the fuel supply pump 116 via the fuel filter 121 and the low pressure pipe 122. The fuel supply pump 116 of the embodiment is arranged in the vicinity of the intake manifold 73. On the other hand, the common rail 120 is connected to an air discharge side of the fuel supply pump 116 via a high pressure pipe 123. The injectors 115 for four cylinders are connected to the common rail 120 via four fuel injection pipes 126.

In the structure mentioned above, the fuel in the fuel tank 118 is pressure fed to the common rail 120 by the fuel supply pump 116, and the fuel having the high pressure is stored in the common rail 120. Each of the fuel injection valves 119 is controlled to be opened and closed, whereby the fuel having the high pressure within the common rail 120 is injected to each of the cylinders of the engine 70 from each of the injectors 115. In other words, an injection pressure, an injection timing, and an injection period (an injection amount) of the fuel which is supplied from each of the injectors 115 are controlled with a high precision. Accordingly, it is possible to reduce a nitrogen oxide (NOx) from the engine 70, and it is possible to reduce a noise vibration of the engine 70.

Figure 3:
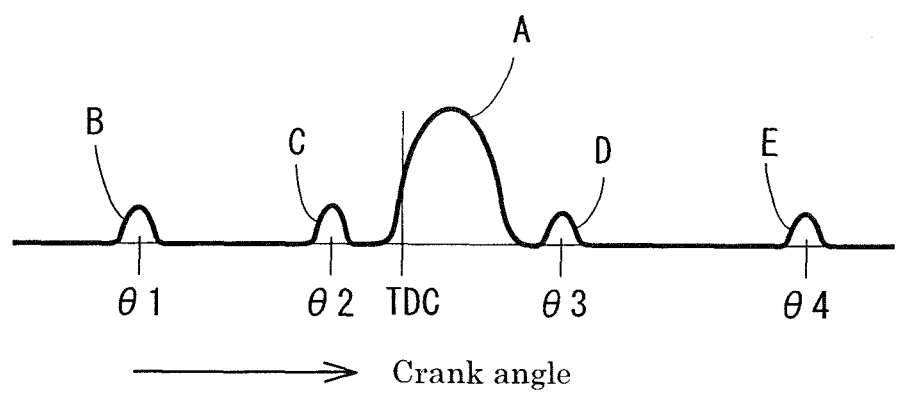
FIG. 3 is a view describing an injection timing of a fuel.

As shown in FIG. 3, the common rail system 117 is structured such as to execute a main injection A in the vicinity of a top dead center (TDC). Further, the common rail system 117 is structured such as to execute a small amount of pilot injection B for reducing the NOx and the noise at a moment of a crank angle θ1 which is about 60 degree before the top dead center, execute a pre injection C for reducing the noise at a moment of a crank angle θ2 which is just before the top dead center, and execute an after injection D and a post injection E for reducing a particulate matter (hereinafter, refer to as PM) and promoting a purification of the exhaust gas at a moment of crank angles θ3 and θ4 which are after the top dead center, in addition to the main injection A.

In this case, as shown in FIG. 1, the fuel supply pump 116 is connected to the fuel tank 118 via a fuel return pipe 129. A common rail return pipe 131 is connected to an end portion in a longitudinal direction of the cylindrical common rail 120 via a return pipe connector 130 which controls a pressure of the fuel within the common rail 120. In other words, a surplus fuel in the fuel supply pump 116 and a surplus fuel in the common rail 120 are recovered in the fuel tank 118 via the fuel return pipe 129 and the common rail return pipe 131.

To an exhaust pipe 77 which is connected to a downstream side of an exhaust gas in the exhaust manifold 71, there are connected an exhaust gas throttle device 82 for regulating an exhaust gas pressure of the engine 70, and a diesel particulate filter (hereinafter, refer to as DPF) 50 which corresponds to one example of the exhaust gas purification device. The exhaust gas discharged from each of the cylinders to the exhaust manifold 71 is discharged to an outside after being applied a purifying process via the exhaust pipe 77, the exhaust gas throttle device 82 and the DPF 50.

The DPF 50 is provided for collecting the PM or the like in the exhaust gas. The DPF 50 of the embodiment is structured such that a diesel oxidation catalyst 53, for example, a platinum or the like, and a soot filter 54 are arranged in series and accommodated in an approximately tubular filter case 52 within a casing 51 which is made of a heat resisting metal material. In the embodiment, the diesel oxidation catalyst 53 is arranged in an upstream side of the exhaust gas within the filter case 52, and the soot filter 54 is arranged in a downstream side of the exhaust gas. The soot filter 54 is formed as a honeycomb structure having a lot of cells which are sectioned by a porous (filterable) partition wall.

One side portion of the casing 51 is provided with an exhaust gas introduction port 55 which is communicated with the downstream side of the exhaust gas from the exhaust gas throttle device 82 among the exhaust pipe 77. One end portion of the casing 51 is occluded by a first bottom plate 56, and one end portion facing to the first bottom plate 56 among the filter case 52 is occluded by a second bottom plate 57. A heat insulating material 58 such as a glass wool is filled in an annular gap between the casing 51 and the filter case 52, and a gap between both the bottom plates 56 and 57, in such a manner as to surround a periphery of the diesel oxidation catalyst 53 and the soot filter 54. The other side portion of the casing 51 is occluded by two lid plates 59 and 60, and an approximately tubular exhaust gas discharge port 61 passes through both the lid plates 59 and 60. Further, a portion between both the lid plates 59 and 60 is a resonance chamber 63 which is communicated with an inner side of the filter case 52 via a plurality of communication pipes 62.

An exhaust gas introduction pipe 65 is inserted to the exhaust gas introduction port 55 which is formed in the one side portion of the casing 51. A leading end of the exhaust gas introduction pipe 65 protrudes to a side face in an opposite side to the exhaust gas introduction port 55 while cutting across the casing 51. A plurality of communication holes 66 which are open toward the filter case 52 are formed in an outer peripheral surface of the exhaust gas introduction pipe 65. A portion protruding to the side face in the opposite side to the exhaust gas introduction port 55 among the exhaust gas introduction pipe 65 is occluded by a lid body 67 which is detachably attached by screw thereto.

The DPF 50 is provided with a DPF temperature sensor 26 which detects a temperature of the exhaust gas within the DPF 50, as one example of detecting means. The DPF temperature sensor 26 of the embodiment is installed while passing through the casing 51 and the filter case 52, and a leading end of the DPF temperature sensor 26 is positioned between the diesel oxidation catalyst 53 and the soot filter 54.

Further, the DPF 50 is provided with a differential pressure sensor 68 which detects a clogged state of the soot filter 54, as one example of the detecting means. The differential pressure sensor 68 of the embodiment is structured such as to detect a pressure difference (a differential pressure) between upstream and downstream sides with respect to the soot filter 54 within the DPF 50. In this case, an upstream side exhaust gas pressure sensor 68a constructing the differential pressure sensor 68 is installed to the lid body 67 of the exhaust gas introduction pipe 65, and a downstream side exhaust gas pressure sensor 68b is installed between the soot filter 54 and the resonance chamber 63. It has been well known that a definite principle exists between the pressure difference between the upstream and downstream sides of the DPF 50, and a PM deposition amount within the DPF 50. In the embodiment, a renewing control (a DPF renewing control) of the soot filter 54 is executed by estimating the PM deposition amount within the DPF 50 from the pressure difference which is detected by the differential pressure sensor 68, and actuating the intake air throttle device 81 and the common rail 120 on the basis of the estimated result.

In this case, the clogged state of the soot filter 54 may be detected by an exhaust gas pressure sensor which detects the pressure in the upstream side of the soot filter 54 within the DPF 50, without being limited to the differential pressure sensor 68. In the case that the exhaust gas pressure sensor is employed, the clogged state of the soot filter 54 is determined by comparing a pressure (a reference pressure) in the upstream side of the soot filter 54 under a brand-new state in which the PM is not deposited up in the soot filter 54, with the current pressure which is detected by the exhaust gas pressure sensor.

In the structure mentioned above, the exhaust gas from the engine 5 enters into the exhaust gas introduction pipe 65 via the exhaust gas introduction port 55, is spouted out into the filter case 52 from each of the communication holes 66 which are formed in the exhaust gas introduction pipe 65, is dispersed into a wide region within the filter case 52, and thereafter passes through the diesel oxidation catalyst 53 and the soot filter 54 in this order so as to be purified. The PM in the exhaust gas can not pass through the porous partition wall between the cells in the soot filter 54 at this stage, and is collected. Thereafter, the exhaust gas passing through the diesel oxidation catalyst 53 and the soot filter 54 is discharged from the exhaust gas discharge port 61.

If the temperature of the exhaust gas exceeds a renewal boundary temperature (for example, about 300° C.) at a time when the exhaust gas passes through the diesel oxidation catalyst 53 and the soot filter 54, NO (nitrogen monoxide) in the exhaust gas is oxidized into an unstable $NO_2$ (nitrogen dioxide) on the basis of an action of the diesel oxidation catalyst 53. Further, a PM collecting capacity of the soot filter 54 is recovered (the DPF 50 is renewed) by oxidation removing the PM which is deposited in the soot filter 54, with O (oxygen) that $NO_2$ discharges at a time of returning to NO.

(2) Structure Relevant to Control of Engine

Figure 4:
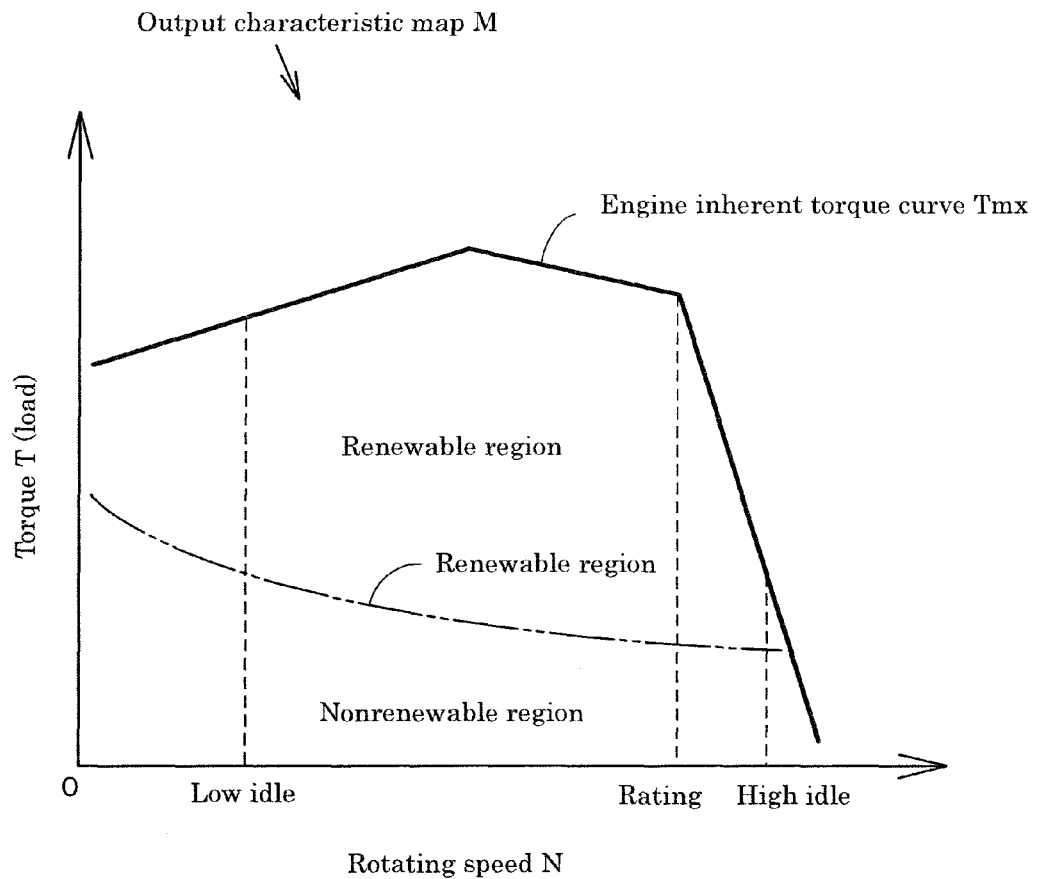
FIG. 4 is an explanatory view of an output characteristic map.

Next, a description will be given of a structure which is relevant to a control of the engine 70 with reference to FIG. 1, FIG. 3 and FIG. 4. As shown in FIG. 1, there is provided with an ECU 11 which actuates the fuel injection valve 119 in each of the cylinders in the engine 70. The ECU 11 has ROM 32 which previously stores various data in a fixed manner, EEPROM 33 which stores control programs and the various data in a rewritable manner, RAM 34 which temporarily stores the control programs and the various data, a timer 35 for measuring a time, and an input and output interface and the like, in addition to CPU 31 which executes various arithmetic processes and controls, and is arranged in the engine 70 or in the vicinity thereof.

To an input side of the ECU 11, there are connected at least a rail pressure sensor 12 which detects the fuel pressure within the common rail 120, an electromagnetic clutch 13 which rotates or stops the fuel pump 116, an engine speed sensor 14 which detects a rotating speed of the engine 70 (a position of a cam shaft of a crank shaft 74), an injection setting device 15 which detects and sets a fuel injection frequency (a frequency in one stroke fuel injection period) of the injector 115, a throttle position sensor 16 which detects an operating position of an accelerator operating device (not shown), an intake air temperature sensor 17 which detects a temperature of the intake air in an intake air route, an exhaust gas temperature sensor 18 which detects a temperature of the exhaust gas in an exhaust gas route, a cooling water temperature sensor 19 which detects a temperature of a cooling water in the engine 70, a fuel temperature sensor 20 which detects a temperature of the fuel within the common rail 120, an emergency switch 21 serving as renewal admittance input means which selects and operates whether an emergency renewing mode mentioned later can be executed, the differential pressure sensor 68 (the upstream side exhaust gas pressure sensor 68a and the downstream side exhaust gas pressure sensor 68*b*), a DPF temperature sensor 26 which detects a temperature of the exhaust gas within the DPF 50, a renewal inhibition button 27 serving as renewal inhibition input means which inhibits a renewing motion of the DPF 50, and parking brake detecting means 30 which detects an on-off state of parking brake operating means 29 (whether the parking brake operating means 29 is in the braked state) which maintains and operates the working machine in a braked state.

Each of electromagnetic solenoids of the fuel injection valves 119 for at least four cylinders is connected to an output side of the ECU 11. In other words, it is structured such that the high-pressure fuel stored in the common rail 120 is injected from the fuel injection valve 119 separately at a plurality of times in one stroke while controlling a fuel injection pressure, an injection timing and an injection period, thereby suppressing the nitrogen oxide (NOx) from being generated, executing a complete combustion in which the generation of the PM and a carbon dioxide is reduced, and improving a fuel consumption.

Figure 5:
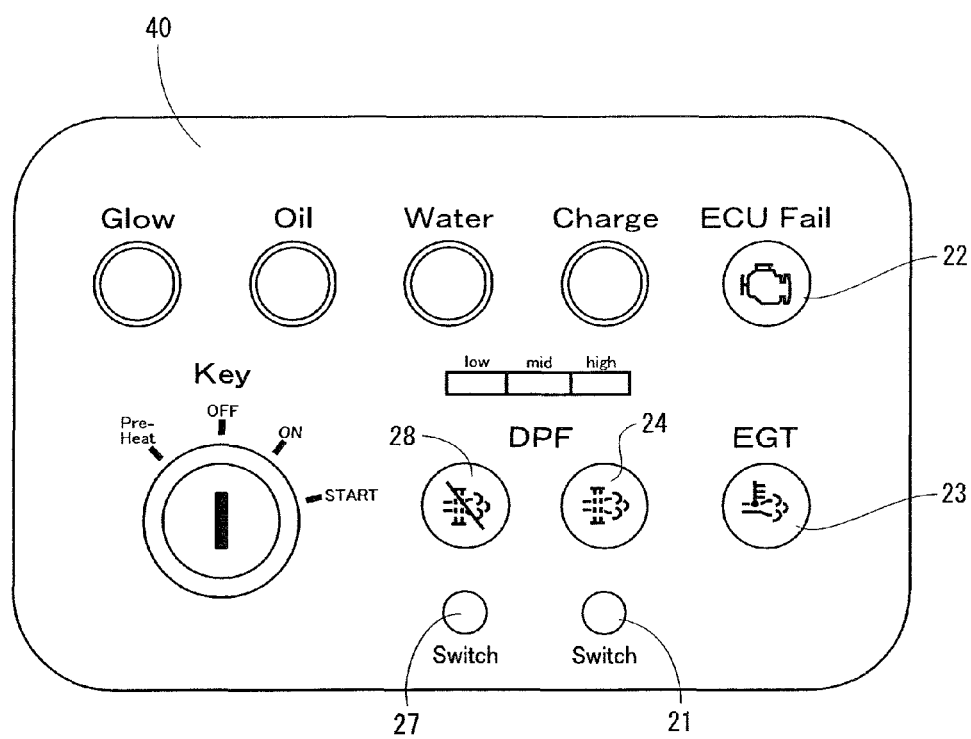
FIG. 5 is an explanatory view of an instrument panel.

Further, to an output side of the ECU 11, there are connected the intake air throttle device 81 for adjusting an intake air pressure (an intake air amount) of the engine 70, the exhaust gas throttle device 82 for adjusting an exhaust gas pressure of the engine 70, an ECU failure lamp 22 which gives a warning and informs of a failure of the ECU 11, an exhaust gas temperature warning lamp 23 serving as abnormally high temperature informing means which informs of abnormally high temperature of the exhaust gas within the DPF 50, a renewal lamp 24 which turns on with a renewing motion of the DPF 50, and a renewal inhibition lamp 28 serving as renewal inhibition informing means which is actuated during a pushing operation of the renewal inhibition button 27 (an inhibiting operation). Data relating to blinking of each of the lamps 22 to 24 and 28 is previously stored in the EEPROM 33 of the ECU 11. Though details will be mentioned later, the renewal lamp 24 constructs a single display device serving as renewal advance notifying means which is actuated if the clogged state of the DPF 50 becomes equal to or more than a prescribed level, and renewal informing means which informs of the matter that the DPF 50 is under renewing motion. In this case, as shown in FIG. 5, the emergency switch 21, the renewal inhibition button 27 and each of the lamps 22 to 24 and 28 are provided in an instrument panel 40 which exists in a working machine to which the engine 70 is mounted.

The emergency switch 21 belongs to an alternate motion type. In other words, the emergency switch 21 is a lock type push switch which is locked at a push-down position by one push-down motion, and is returned to the original position by one more push-down motion. If the emergency switch 21 is pushed down in the case that the clogged state of the DPF 50 is not improved even by executing a reset renewing mode mentioned later, the mode can be changed to an emergency renewing mode mentioned later. The renewal inhibition button 27 belongs to a momentary motion type. In other words, the renewal inhibition button 27 is a non-lock type push switch which emits one ON pulse signal by one push-down motion. While the operator pushes down the renewal inhibition button 27*a* current drive state in the engine 70 is inhibited and the execution of the automatic auxiliary renewing mode and the reset renewing mode is inhibited. While the operator pushes down the renewal inhibition button 27, a forced drive of the engine 70 and a post injection such that the temperature of the exhaust gas rises are prevented.

An output characteristic map M (refer to FIG. 3) indicating a relationship between a rotating speed N and a torque T (a load) of the engine 70 is previously stored in the EEPROM 33 of the ECU 11. The output characteristic map M is determined by an experiment or the like. In the output characteristic map M shown in FIG. 3, the rotating speed N is employed as a transverse axis, and the torque T is employed as a vertical axis. The output characteristic map M is a region which is surrounded by a solid line Tmx drawn convex upward. The solid line Tmx is a maximum torque line which indicates a maximum torque with respect to each of the rotating speed N. In this case, if the type of the engine 70 is the same, the output characteristic maps M stored in the ECU 11 are identical (common). As shown in FIG. 3, the output characteristic map M is segmented up and down by a boundary line BL which expresses a relationship between the rotating speed N and the torque T in the case that the temperature of the exhaust gas is a renewal boundary temperature (about 300° C.). A region in an upper side with respect to the boundary line BL is a renewable region in which the PM deposited in the soot filter 54 can be oxidized and removed (in which an oxidizing action of the oxidation catalyst 53 works), and a region in a lower side is a nonrenewable region in which the PM is deposited in the soot filter 54 without being oxidized and removed.

The ECU 11 basically executes a fuel injection control which computes the torque T on the basis of the output characteristic map M, the rotating speed N which is detected by the engine speed sensor 14, and the throttle position which is detected by the throttle position sensor 16 so as to determine a target fuel injection amount, and actuates the common rail system 117 on the basis of the result of computation. In this case, the fuel injection amount is adjusted by adjusting a valve open period of each of the fuel injection valves 119, and changing an injection period into each of the injectors 115.

(3) Aspect of DPF Renewing Control

Next, a description will be given of one example of the renewing control of the DPF 50 by the ECU 11 with reference to flow charts in FIG. 6 to FIG. 8. The control mode of the engine 70 (the control type relating to the renewal of the DPF 50) includes at least a normal drive mode which carries out a road travel and various works, an automatic auxiliary renewing mode which automatically raises the temperature of the exhaust gas when clogged state of the DPF 50 becomes equal to or more than a prescribed level, a reset renewing mode (which may be called also as a forced renewing mode) which supplies the fuel into the DPF 50 by a post injection E, an emergency renewing mode which maintains a rotating speed N of the engine 70 at a high idle rotating speed as well as supplying the fuel into the DPF 50 by the post injection E, and a limp home mode which sets the engine 70 to a minimum drive state (makes the working machine secure a minimum travel function).

In the automatic auxiliary renewing mode, an intake air amount and an exhaust gas amount are limited by closing at least one of the intake air throttle device 81 and the exhaust gas throttle device 82 to a predetermined opening degree, on the basis of the detected information of the differential pressure sensor 68. Accordingly, since the load of the engine 70 is increased, in conjunction with this, the output of the engine 70 is increased and the temperature of the exhaust gas from the engine 70 is raised. As a result, it is possible to burn and remove the PM within the DPF 50 (the soot filter 54).

The reset renewing mode (the forced renewing mode) is executed in the case that the clogged state of the DPF 50 is not improved (the PM remains) even by executing the automatic auxiliary renewing mode, and the case that an accumulated drive time Te of the engine 70 exceeds a set time T0 (for example, about 100 hours). In the reset renewing mode, the temperature of the exhaust gas within the DPF 50 is raised (about 560° C.), by supplying the fuel into the DPF 50 by the post injection E, and burning the fuel by the diesel oxidation catalyst 53. As a result, it is possible to forcibly burn and remove the PM within the DPF 50 (the soot filter 54).

The emergency renewing mode is executed in the case that the clogged state of the DPF 50 is not improved even by executing the reset renewing mode. In the emergency renewing mode, the temperature of the exhaust gas from the engine 70 is raised by maintaining the rotating speed N of the engine 70 at a high idle rotating speed (a maximum rotating speed) in addition to the control aspect of the reset renewing mode mentioned above (the execution of the post injection E), and the temperature of the exhaust gas is raised by the post injection E within the DPF 50 (about 600° C.). As a result, it is possible to forcibly burn and remove the PM within the DPF 50 (the soot filter 54) under a more preferable condition than the reset renewing mode.

The limp home mode is executed in the case that the clogged state of the DPF 50 is not improved even by executing the emergency renewing mode and the PM is excessively deposited (possibility of the PM runaway combustion is high), and the case that the runaway combustion of the PM is generated within the DPF 50. In the limp home mode, the engine 70 is held to a minimum drive state by restricting an upper limit of the output (the rotating speed N and the torque T) of the engine 70, and a drivable time of the engine 70. As a result, it is possible to get out the working machine, for example, from a work area or move it to a dealership and a service center. In other words, it is possible to make the working machine secure the minimum traveling function.

As is known from the description relating to each of the modes mentioned above, for example, the engine 70, the intake air throttle device 81, the exhaust gas throttle device 82 and the common rail system 117 are the members which involved in the renewing motion of the DPF 50. These elements 70, 81, 82 and 117 construct the renewing device for burning and removing the PM within the DPF 50.

Figure 6:
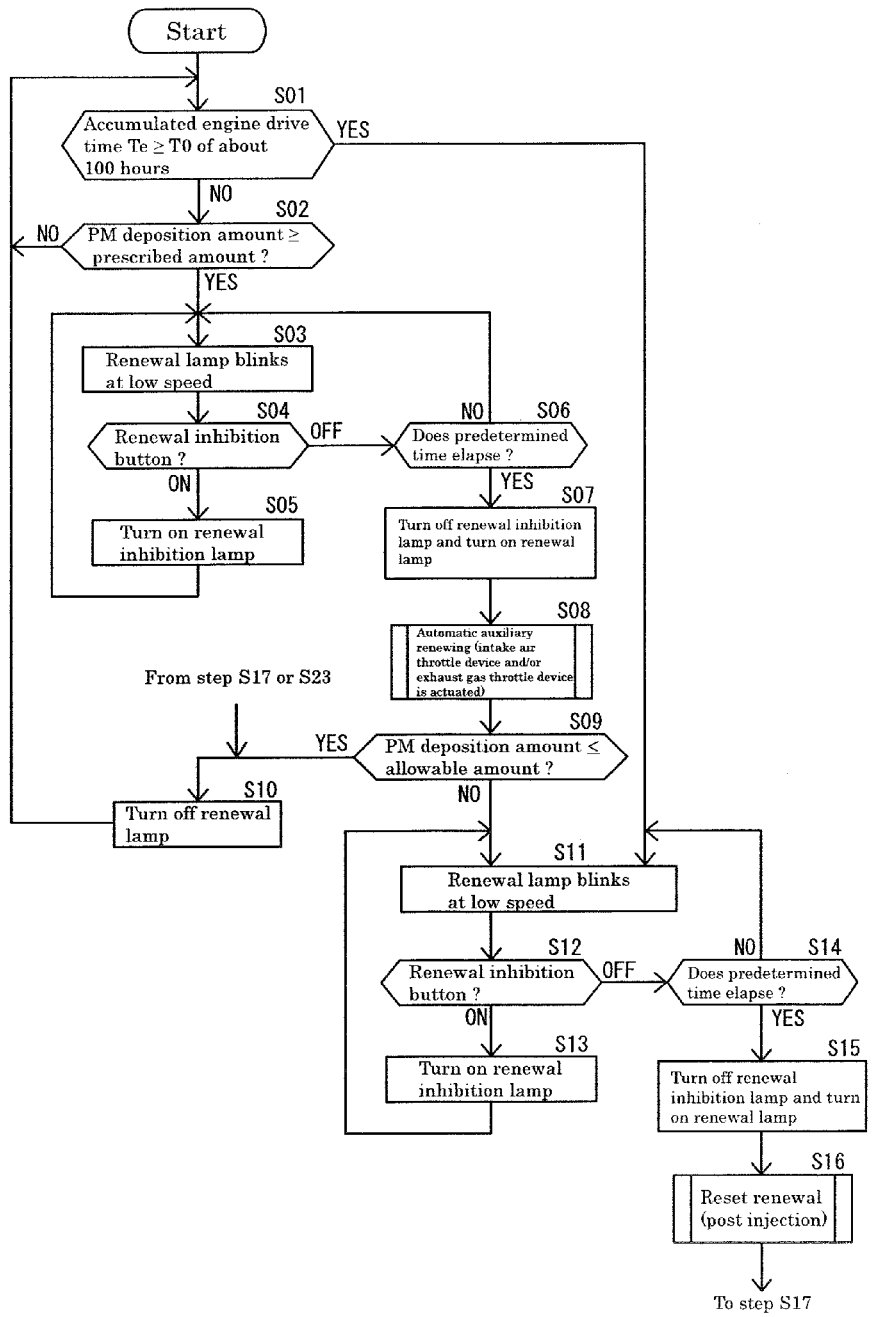
FIG. 6 is a first half portion of a flow chart showing a flow of a DPF renewing control.
Figure 7:
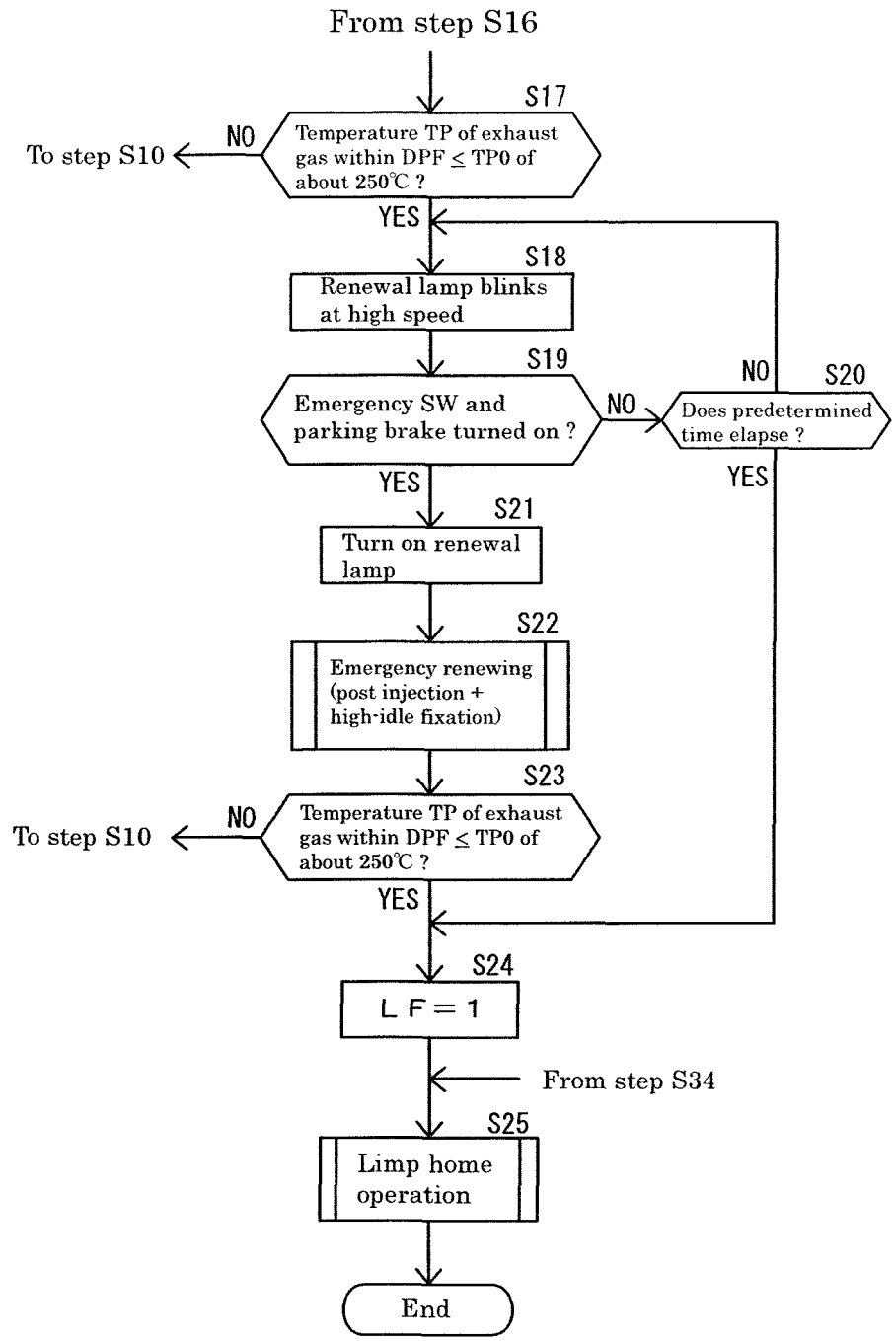
FIG. 7 is a second half portion of the flow chart showing the flow of the DPF renewing control.
Figure 8:
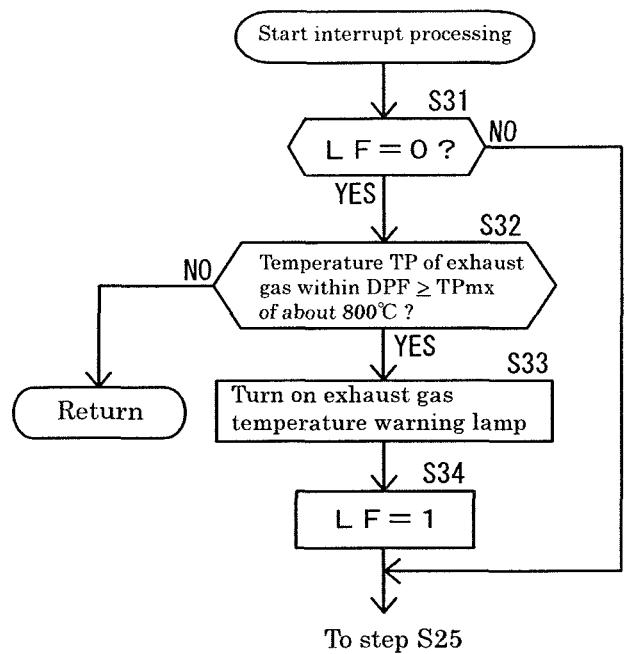
FIG. 8 is a flow chart showing an interrupt processing.

As shown in FIG. 6 to FIG. 8, each of the modes is executed on the basis of a command of the ECU 11. In other words, an algorithm shown by the flow charts in FIG. 6 to FIG. 8 is stored in the EEPROM 33. Further, each of the modes mentioned above is executed by calling the algorithm to the RAM 34 and processing in the CPU 31. Roughly speaking, steps in S01 to S06 shown in FIG. 6 correspond to the normal drive mode, and a step in S08 corresponds to the automatic auxiliary renewing mode. A step in S16 shown in FIG. 6 corresponds to the reset renewing mode, and a step in S22 shown in FIG. 7 corresponds to the emergency renewing mode. Further, a step in S26 shown in FIG. 7 corresponds to the limp home mode.

As shown by the flow charts in FIG. 6 and FIG. 7, in the renewing control of the DPF 50, firstly, it is determined whether an accumulated drive time Te of the engine 70 is equal to or more than a set time T0 (S01). The normal drive mode is executed in this stage. The set time T0 of the embodiment is set, for example, to about 100 hours. In this case, the accumulated drive time Te of the engine 70 is measured by using a time information of a timer 35 in the ECU 11 while the engine 70 is driven, and is stored and accumulated in the EEPROM 33.

If the accumulated drive time Te is equal to or more than the set time T0 (S01: YES), the step goes to a step S11 mentioned later. If the accumulated drive time Te is less than the set time T0 (S01: NO), a PM deposition amount within the DPF 50 is next estimated on the basis of the detected result by the differential pressure sensor 68, and it is determined whether the estimated result is equal to or more than a prescribed amount (a prescribed level) (S02). In the case that it is judged that the PM deposition amount is less than the prescribed amount (S02: NO), the step goes back to the step S01 and the normal drive mode is proceeded. The prescribed amount of the embodiment is set, for example, to 8 g/l. In the case that it is judged that the PM deposition amount is equal to or more than the prescribed amount (S02: NO), the measurement on the basis of the time information of the timer 35 is started so as to make the renewal lamp 24 blink at a low speed (S03) and the execution of the renewing motion of the DPF 50 (the automatic auxiliary renewing mode) is advance notified to the operator. In this case, a blinking frequency of the renewal lamp 24 is set, for example, to 1 Hz.

Next, it is determined whether the renewal inhibition button 27 is under the push-down operation (the inhibiting operation) (S04), if it is under the push-down operation (S04: ON), the renewal inhibition lamp 28 is turned on (S05), and thereafter the step goes back to the step S03. Accordingly, in the steps in S03 to S05, the control mode of the engine 70 stays in the normal drive mode in spite of the matter that the PM deposition amount is equal to or more than the prescribed amount, and the current drive state in the engine 70 is maintained. In other words, the change to the automatic auxiliary renewing mode (which may be called as the renewing motion of the DPF 50, or the actuation of the renewing device) is inhibited. Further, while the renewal inhibition button 27 is pushed, the fact that the renewing motion of the DPF 50 (the automatic auxiliary renewing mode) is inhibited is visually appealed to the operator by turning on the renewal inhibition lamp 28, thereby securely calling the operator's attention.

In the step S04, if the renewal inhibition button 27 is not under the push operation (S04: OFF), it is determined whether a predetermined time (for example, 10 seconds) elapses after starting the low speed blinking of the renewal lamp 24 (S06). If the predetermined time does not elapse (S06: NO), the step goes back to the step S03 as it is. If the predetermined time elapses (S06: YES), the renewal lamp 24 which blinks at the low speed is turned on (S07) while turning off the renewal inhibition lamp 28, and thereafter the automatic auxiliary renewing mode is executed (S08).

If the renewal advance notification of the DPF 50 and the following renewal information of the DPF 50 (the fact that the renewing device is under actuation of the renewing device) are displayed by differentiating the blinking aspect of the renewal lamp 24 as mentioned above, the operator can previously assume the shock of the fluctuation of the torque T and the change of the engine 70 sound which are generated thereafter by the renewal advance notification of the PDF 50. Further, the operator can easily comprehend the change to the renewing motion of the DPF 50 by informing the renewal information of the DPF 50. Accordingly, it is possible to do away with the uncomfortable feeling of the operator which is caused by the renewing motion of the DPF 50. Further, since it is possible to recognize the renewal advance notification of the DPF 50 and the renewal information of the DPF 50 distinctly from each other only by the blinking aspect of the renewal lamp 24, it is easy to comprehend with or without the renewing motion of the DPF 50. In addition, it is not necessary to provide each of the renewal advance notifying means and the renewal informing means, and it is possible to contribute to a cost reduction of this kind of display device.

In the automatic auxiliary renewing mode, the temperature of the exhaust gas is raised by increasing the load of the engine 70 by the restriction of the intake air amount or the exhaust gas amount using at least one of the intake air throttle device 81 and the exhaust gas throttle device 82, as mentioned above, and increasing the output of the engine 70 in conjunction with this. As a result, the PM within the DPF 50 is burnt and removed, and the PM collecting capacity of the DPF 50 is recovered. The automatic auxiliary renewing mode of the embodiment is executed, for example, for about 20 minutes, and the opening degrees of the intake air throttle device 81 and the exhaust gas throttle device 82 are returned to the original state before narrowing them, after an elapse of the time.

After the execution of the automatic auxiliary renewing mode, the PM deposition amount within the DPF 50 is estimated again on the basis of the detected result by the differential pressure sensor 68, and it is determined whether the estimated result is equal to or less than an allowable amount (S09). In the case that it is judged that the PM deposition amount is equal to or less than the allowable amount (S09: YES), an end of the automatic auxiliary renewing mode is informed by turning off the renewal lamp 24 (S10), and the step goes back to the step S01 so as to execute the normal drive mode. The allowable amount of the embodiment is set, for example, to 4 g/l. In the case that it is judged that the PM deposition amount exceeds the allowable amount (S09: NO), there comes to a state in which the PM within the DPF 50 is not sufficiently removed (the clogged state is not improved) in spite of the execution of the automatic auxiliary renewing mode. Accordingly, the measurement on the basis of the time information of the timer 35 is started and the step makes the renewal lamp 24 blink at a low speed (S11) and the execution of the renewing motion of the DPF 50 is advance notified to the operator (the reset renewing mode). In this case, a blinking frequency of the renewal lamp 24 is set, for example, to 1 Hz, in the same manner as the case of the automatic auxiliary renewing mode.

Next, it is determined whether the renewal inhibition button 27 is under pushing operation (S12), and if it is under operation (S04: ON), the renewal inhibition lamp 28 is turned on (S13) and thereafter the step goes back to the step S11. Therefore, in the steps S11 to S13, the current drive state in the engine 70 is maintained in spite of the fact that the clogged state of the DPF 50 is not improved, and the change to the reset renewing mode is inhibited. Further, in this case, while the renewal inhibition button 27 is operated to be pushed, the fact that the renewing motion of the DPF 50 (the reset renewing mode) is inhibited is visually appealed to the operator by turning on the renewal inhibition lamp 28, thereby calling the operator's attention securely.

In the step S12, if the renewal inhibition button 27 is not under pushing operation (S12: OFF), it is determined whether a predetermined time (for example, 10 seconds) elapses after starting the blinking of the renewal lamp 24 at the low speed (S14). If the predetermined time does not elapse (S14: NO), the step goes back to the step S11 as it is. If the predetermined time elapses (S14: YES), the renewal inhibition lamp 28 is turned off, the renewal lamp 24 which blinks at the low speed is turned on (S15), and the reset renewing mode is executed (S16).

In the reset renewing mode, as mentioned above, the temperature of the exhaust gas within the DPF 50 is raised by supplying the fuel into the DPF 50 by the post injection E of the common rail system 117 and burning the fuel by the diesel oxidation catalyst 53. As a result, the PM within the DPF 50 is forcibly burnt and removed, and the PM collecting capacity of the DPF 50 is recovered. The reset renewing mode of the embodiment is executed, for example, for about 30 minutes, and the common rail system 117 does not carry out the post injection E after the elapse of the time. In this case, if the reset renewing mode is executed, the accumulated drive time Te of the engine 70 is reset, and is newly measured by using the time information of the timer 35.

After the execution of the reset renewing mode, it is determined whether the temperature TP of the exhaust gas within the DPF 50 which is detected by the DPF temperature sensor 26 is equal to or less than a previously set lower limit temperature TP0 (S17). The lower limit temperature TP0 is a temperature lower than the renewal boundary temperature is employed (for example, about 300° C.). In other words, as the lower limit temperature TP0, nonrenewable temperature at which the PM is deposited in the soot filter 54 without being oxidized and removed is employed. The lower limit temperature TP0 of the embodiment is set, for example, to about 250° C. If the temperature TP of the exhaust gas within the DPF 50 exceeds the lower limit temperature TP0 (S17: NO), the step goes to the step S10 the renewal lamp 24 is turned off, and the end of the reset renewing mode is informed. Further, the step goes back to the step S01 so as to execute the normal drive mode.

If the temperature TP of the exhaust gas within the DPF 50 is equal to or less than the lower limit temperature TP0 (S17: YES), there comes to a state in which the temperature of the exhaust gas is not raised and the PM within the DPF 50 is not removed (the clogged state is not improved) in spite of the execution of the reset renewing mode. Accordingly, the renewal lamp 24 blinks at a high speed (S18), and the operator of the execution of the renewing motion of the DPF 50 (the emergency renewing mode) is advance notified. In this case, a blinking frequency of the renewal lamp 24 is set to a frequency which is different from the cases of the automatic auxiliary renewing mode and the reset renewing mode. For example, the blinking frequency of the renewal lamp 24 for advance notifying the emergency renewing mode is set to 2 Hz.

Next, it is determined whether both of the emergency switch 21 and the parking brake operating means 29 are under operation state (S19). This intends to inhibit the change to the emergency renewing mode until the operator intentionally stops the traveling and the various works of the working machine, in order to widely enhance the rotating speed N of the engine 70 in the emergency renewing mode. If both of the emergency switch 21 and the parking brake operating means 29 are in operation state (S19: YES), the renewal lamp 24 blinking at the high speed is turned on (S21) and thereafter executes the emergency renewing mode (S22). In this case, only the on-off state of the emergency switch 21 may be determined, or only the on-off state of the parking brake operating means 29 may be determined. In this case, on the basis of the operation of both the emergency switch 21 and the parking brake operating means 29, more effect can be achieved as an interlock structure (a glitch preventing structure) with respect to the execution of the emergency renewing mode.

In the emergency renewing mode, as mentioned above, the fuel is supplied into the DPF 50 by the post injection E of the common rail system 117, and the fuel is burnt by the diesel oxidation catalyst 53. In addition, the injection state of the fuel to each of the cylinders is adjusted by an electronic control of the common rail system 117, and the rotating speed N of the engine 70 is maintained at a high idle rotating speed (a maximum rotating speed). Accordingly, after raising the temperature of the exhaust gas from the engine 70, the temperature of the exhaust gas is raised within the DPF 50 by the post injection E (about 600° C.). As a result, it is possible to forcibly burn and remove the PM within the DPF 50 under a further more preferable condition than the reset renewing mode, and it is possible to recover the PM collecting capacity of the DPF 50. The emergency renewing mode of the embodiment is executed, for example, for about 15 minutes, and after the elapse of the time, the common rail system 117 does not carry out the post injection E, and the injection state of the fuel to each of the cylinders is adjusted so as to return the rotating speed N of the engine 70 to the original rotating speed before the high idle fixation.

After the execution of the emergency renewing mode, it is determined whether the temperature TP of the exhaust gas within the DPF 50 which is detected by the DPF temperature sensor 26 is equal to or less than the lower limit temperature TP0 (S23). If the temperature TP of the exhaust gas within the DPF 50 exceeds the lower limit temperature TP0 (S23: NO), the step goes to the step S10, the renewal lamp 24 is turned off, and the end of the emergency renewing mode is informed. Further, the step goes back to the step S01 so as to execute the normal drive mode.

If the temperature TP of the exhaust gas within the DPF 50 is equal to or less than the lower limit temperature TP0 (S23: YES), there comes to the PM excessively deposited state in which the exhaust gas temperature does not rise and the clogged state of the DPF 50 is not improved, in spite of the execution of the reset renewing mode. In this case, since there is a possibility of the PM runaway combustion, after a limp home flag LF is set (LF=1, S24), the limp home mode is executed (S25). In the limp home mode, as mentioned above, the engine 70 is held in the minimum drive state by restricting upper limit values Nmx and Tmx of the output (the rotating speed N and the torque T) of the engine 70, and a drivable time Tmx of the engine 70. As a result, it is possible to secure a minimum traveling function in the working machine.

In this case, the limp home flag LF corresponds to the fact whether the limp home mode was executed in the past, and is set such that it is not reset until using an external tool (existing, for example, in a dealership or a service center) which is connected to the ECU 11 via a communication terminal line. Accordingly, it is set such that once the limp home mode is executed, the mode can not be returned to the other mode until inspecting and maintaining in the dealership or the service center so as to reset the limp home flag.

Further, the limp home mode is set such that the rotating speed N and the torque T of the engine 70 are lowered little by little to the upper limit threshold values Nmx and Tmx in the case that the current rotating speed N and torque T in the engine 70 are greater than the upper limit threshold values Nmx and Tmx. Accordingly, in the case of the change to the limp home mode, it is possible to prevent the rotating speed N and the torque T from being changed (lowered) rapidly so as to do away with the uncomfortable feeling of the operator at the time of execution of the limp home mode, and it is possible to avoid a problem that the operator can not deal with it so as to cause the engine stall.

In this case, in the step S19, if both of the emergency switch 21 and the parking brake operating means 29 are not in the on state (S19: NO), it is determined whether a predetermined time (for example, 30 minutes) elapses after the start of the high-speed blinking of the renewal lamp 24 (S20). If the predetermined time does not elapse (S20: NO), the step goes back to the step S18 as it is. If the predetermined time elapses (S20: YES), there is understood that the DPF 50 is in the PM excessively deposited state because the emergency renewing mode is failed in spite of the fact that the emergency renewing mode should be executed. Accordingly, after the limp home flag LF is set (LF=1, S24), the limp home mode is executed (S25).

In this case, the ECU 11 of the embodiment is structured such that an interrupt processing shown in FIG. 8 is executed under execution of the renewing control of the DPF 50. In the interrupt processing, the detected result of the DPF temperature sensor 26 is checked at appropriate time intervals. In this case, as shown by a flow chart in FIG. 8, it is determined whether the limp home flag LF is reset (S31). If the limp home flag LF is in the set state (S31: NO), the step goes to the step S25 and the limp home mode is executed because it is not possible to return to the other mode from the limp home mode.

If the limp home flag LF is in the reset state (S31: YES), it is determined whether the temperature TP of the exhaust gas within the DPF 50 which is detected by the DPF temperature sensor 26 exceeds a previously set abnormal temperature TPex (S32) in the case that the temperature TP exceeds the abnormal temperature TPex (S32: YES) the exhaust gas temperature warning lamp 23 serving as the abnormally high temperature informing means is turned on (S33), and thereafter sets the limp home flag LF is set (S34). Further, the step goes to the step S25 so as to execute the limp home mode. The abnormal temperature TPex of the embodiment is set to, for example, about 800° C. The state in which the temperature TP of the exhaust gas within the DPF 50 exceeds the abnormal temperature TPex can be understood as the runaway combustion of the excessively deposited PM. In this case, there is a risk that the DPF 50 is broken (melt-away), and an excessive emission (air contaminant) is discharged. Accordingly, the step is quickly changed to the limp home mode.

In this case, it is possible to employ an interrupt processing which determines on the basis of the detected result of the differential pressure sensor 68 whether an abnormally differential pressure is generated and changes to the limp home mode in the case that the abnormally differential pressure is generated. The case that the abnormally differential pressure is generated can be understood as the PM excessively deposited state in which the possibility of the PM runaway combustion is concerned. Accordingly, in this case, it is desirable to quickly change to the limp home mode.

(4) Summary

As is apparent from the above description and FIG. 1. FIG. 5 and FIG. 6, since the exhaust gas purification device 50 which is arranged in the exhaust gas route 77 of the common rail type engine 70, the renewing devices 70, 81, 82 and 117 for burning and removing the particulate matter within the exhaust gas purification device 50, the renewal advance notifying means 24 which is actuated in the case that the clogged state of the exhaust gas purification device 50 becomes equal to or more than the prescribed level, and the renewal informing means 24 which informs of the matter that the renewing devices 70, 81, 82 and 117 are under operation are provided, and it is structured such that the renewal advance notifying means 24 is actuated before actuating the renewing devices 70, 81, 82 and 117, the operator can previously assume the shock of fluctuation of the torque T and the change of sound of the engine 70 which are generated thereafter, by the renewal advance notification. Further, by the renewal information, the operator can easily comprehend the change to the renewing motion of the exhaust gas purification device 50. Therefore, it is possible to achieve the effect that the uncomfortable feeling of the operator caused by the renewing motion of the exhaust gas purification device 50 can be done away. For example, it is possible to compensate a defect in the renewing motion of the exhaust gas purification device 50 which may obstruct the careful work which the operator executes on the basis of the sound of the engine 70.

As is apparent from the above description and FIG. 1, FIG. 5 and FIG. 6, since the renewal advance notifying means 24 and the renewal informing means 24 are constructed by the single display device 24, and are structured such as to display the renewal advance notification and the renewal information on the basis of the different aspects, it is possible to recognize the renewal advance notification and the renewal information distinctly from each other by the different aspects despite using the single display device. Accordingly, it is possible to achieve an effect that the operator easily comprehends with or without the renewing motion of the exhaust gas purification device 50. In addition, it is not necessary to provide the renewal advance notifying means 24 and the renewal informing means 24 individually, and it is possible to contribute to a cost reduction of this kind of display device 24.

As is apparent from the above description and FIG. 1, FIG. 5 and FIG. 6, since the renewal inhibition input means 27 which inhibits the renewing motion of the exhaust gas purification device 50 is provided, and it is structured such as to prevent the renewing devices 70, 81, 82 and 117 from being actuated (inhibit the renewing motion of the exhaust gas purification device 50) under inhibiting operation of the renewal inhibition input means 27, regardless of the clogged state of the exhaust gas purification device 50, it is possible to inhibit the renewing motion of the exhaust gas purification device 50 on the basis of the intention of the operator depending on the state of the working machine to which the engine 70 is mounted. Accordingly, through the renewing control for recovering the particulate matter collecting capacity of the exhaust gas purification device 50 can be automatically executed, there can be achieved an effect to smoothly carry out the careful work which the operator executes on the basis of the sound of the engine 70. In other words, it is possible to do away with the defect in the renewing motion of the exhaust gas purification device 50 which may obstruct the careful work.

As is apparent from the above description and FIG. 1, FIG. 5 and FIG. 6, since the renewal inhibition informing means 28 which is actuated under inhibiting operation of the renewal inhibition input means 27 is provided, it is possible to visually appeal to the operator the fact that the renewing motion of the exhaust gas purification device 50 is inhibited, by the information of the renewal inhibition informing means 28, while the renewal inhibition input means 27 is operated to inhibit, and it is possible to securely call the operator's attention. There is an advantage that it is possible to easily confirm whether the renewal is under inhibition, by checking the state of the renewal inhibition informing means 28.

As is apparent from the above description and FIG. 1, FIG. 6 and FIG. 7, since it is structured such as to execute the emergency renewing mode which supplies the fuel into the exhaust gas purification device 50 by the post injection E and maintains the rotating speed N of the engine 70 at the predetermined value (the high-idle rotating speed), in the case that the clogged state of the exhaust gas purification device 50 is not improved even by executing the reset renewing mode which supplies the fuel into the exhaust gas purification device 50 by the post injection E, it is possible to prevent the particulate matter within the exhaust gas purification device 50 from increasing to the excessively deposited state which may cause the runaway combustion, and it is possible to inhibit the runaway combustion of the particulate matter from being generated within the exhaust gas purification device 50. Therefore, it is possible to prevent a malfunction of the exhaust gas purification device 50 and the engine 70 which is caused by the excessive deposition of the particulate matter.

As is apparent from the above description and FIG. 1 and FIG. 5 to FIG. 7, since the renewal admittance input means 21 which allows the actuation of the renewing devices 70, 81, 82 and 117 is provided, and it is structured such that the renewal advance notifying means 24 is actuated in the case that the clogged state of the exhaust gas purification device 50 is not improved even by executing the reset renewing mode, and the emergency renewing mode is executed in the case that the allowing operation of the renewal admittance input means 21 is carried out under operation of the renewal advance notifying means 24, the emergency renewing mode is not executed without intention of the operator. Accordingly, in the emergency renewing mode in which the rotating speed N of the engine 70 widely rises, the operator can previously assume the shock due to the fluctuation of the torque T and the change of the sound of the engine 70. Therefore, it is possible to avoid an unexpected occurrence, for example, a rapid acceleration of the working machine to which the engine is mounted.

As is apparent from the above description and FIG. 1 and FIG. 6 to FIG. 8, since the parking brake operating means 29 which maintains the working machine mounted with the engine 70 in the braked state is provided, and it is structured such that the emergency renewing mode is not executed regardless of the clogged state of the exhaust gas purification device 50 and the operating state of the renewal admittance input means 21, in the case that the braking operation of the parking brake operating means 29 is not carried out, it is possible to inhibit the mode from changing to the emergency renewing mode until the operator intentionally stops the traveling and the various works of the working machine. Accordingly, in the emergency renewing mode in which the rotating speed N of the engine 70 is widely increased, it is possible to securely avoid an unexpected occurrence, for example, a rapid acceleration of the working machine. In other words, a higher effect can be achieved, as an interlock structure (a glitch preventing structure) with respect to the execution of the emergency renewing mode.

As is apparent from the above description and FIG. 1 and FIG. 6 to FIG. 8, since it is structured such as to return to the normal drive mode in the case that the clogged state of the exhaust gas purification device 50 is improved after the execution of the emergency renewing mode, it is not necessary for the operator to carry out the returning operation, for example, for changing the mode. Therefore, it is possible to save the labor hour, and lighten the operation load of the operator.

As is apparent from the above description and FIG. 1, FIG. 7 and FIG. 8, since the exhaust gas purification device 50 which is arranged in the exhaust gas route 77 of the engine 70 and it is structured such as to execute the limp home mode which restricts the upper limit threshold values Nmx and Tmx of the rotating speed N and the torque T of the engine 70, and the drivable time of the engine 70 in the case that the temperature TP of the exhaust gas within the exhaust gas purification device 50 becomes equal to or more than the abnormal temperature TPex, the engine 70 is held in the minimum drive state by executing the limp home mode in a state in which the runaway combustion of the particulate matter seems to be generated within the exhaust gas purification device 50. In other words, it is possible to secure the minimum traveling function for the working machine to which the engine is mounted. Therefore, it is possible to get out the working machine, for example, from the work area or move the working machine to a dealership or a service center, and evacuate the working machine to the safety area while preventing breakage (melt-away) of the exhaust gas purification device 50 and an excessive emission discharge.

As is apparent from the above description and FIG. 1, FIG. 7 and FIG. 8, since it is structured such that the mode can not be changed to the other modes than the limp home mode after the execution of the limp home mode, even by restarting the engine 70, the exhaust gas purification device 50 is more likely to be damaged once the limp home mode is executed. It is necessary to carry out the inspection and maintenance, for example, in the dealership or the service center. Accordingly, there is an advantage that it is possible to avoid fear that the exhaust gas purification device 50 is used in the damaged state, and to prevent the excessive emission discharge.

As is apparent from the above description and FIG. 1, FIG. 7 and FIG. 8, since it is structured such that the rotating speed N and the torque T of the engine 70 are lowered little by little to the upper limit threshold values Nmx and Tmx in the case that the current rotating speed N and torque T in the engine 70 are larger than the upper limit threshold values Nmx and Tmx, under execution of the limp home mode, it is possible to prevent the rotating speed N and the torque T from being changed (lowered) in the case of the change to the limp home mode. Accordingly, there can be achieved an effect to do away with the uncomfortable feeling of the operator at the time of the execution of the limp home mode and to avoid the problem that the operator can not deal so as to cause the engine stall.

As is apparent from the above description and FIG. 1, FIG. 7 and FIG. 8, since the abnormally high temperature informing means 23 which is actuated in the case that the temperature TP of the exhaust gas within the exhaust gas purification device 50 is equal to or more than the abnormal temperature TPex is provided, it is possible to inform the operator of the exhaust gas temperature abnormality (the runaway combustion), by the information of the abnormally high temperature informing means 23, and it is possible to achieve the effect which is a help of preventing the damage such as the melt-away of the exhaust gas purification device 50 from being expanded.

(5) Others

The present invention is not limited to the embodiments mentioned above, but can be embodied into various aspects. The structure of each of the portions is not limited to the illustrated embodiment, but can be variously changed within a range which does not deflect from the scope of the present invention.

REFERENCE SIGNS LIST

11 ECU
21 Emergency switch (renewal admittance input means)
23 Exhaust gas temperature warning lamp (abnormally high temperature informing means)
24 Renewal lamp (renewal advance notifying means and renewal informing means)
26 DPF temperature sensor
27 Renewal inhibition button (renewal inhibition input means)
28 Renewal inhibition lamp (renewal inhibition informing means)
29 Parking brake operating means
50 DPF (exhaust gas purification device)
70 Engine
117 Common rail system
120 Common rail

The invention claimed is:

1. An exhaust gas purification system for a common rail engine of a working machine, the system comprising:
   an exhaust gas purification device configured to be coupled by at least a pipe to an exhaust manifold of a common rail engine;
   a controller configured to provide control of renewing of the gas purification device by elevating temperature of the exhaust gas sufficiently to burn and remove particulate matter deposited in the exhaust gas purification device;
   means for detecting that a clogged state of the exhaust gas purification device is equal to or more than a prescribed level;
   renewal advance notifying means for providing to an operator of the working machine advance notice of renewal of the gas purification device;
   renewal informing means for indicating to the operator that the renewal is in progress; and
   a controller configured to be actuated by the operator and to inhibit renewing of the gas purification device regardless of the level of the clogging of the exhaust gas purification device.

2. The exhaust gas purification system according to claim 1, further comprising a single display device comprising the renewal advance notifying means and the renewal informing means.

3. The exhaust gas purification system according to claim 1, further comprising renewal inhibition informing means for indicating to the operator that the renewal is inhibited.

4. The exhaust gas purification system according to claim 2, further comprising renewal inhibition informing means for indicating to the operator that the renewal is inhibited.

5. A working machine, comprising a common rail engine in combination with the exhaust gas purification system of claim 1.

* * * * *